July 14, 1964 H. R. FEHLING ETAL 3,140,695
RESERVOIR SEAL FOR WRITING INSTRUMENT
Filed July 20, 1961 3 Sheets-Sheet 1

INVENTORS.
HANS REINHARD FEHLING &
EDWARD HENRY HARVEY
BY
their ATTORNEYS

July 14, 1964 H. R. FEHLING ETAL 3,140,695
RESERVOIR SEAL FOR WRITING INSTRUMENT
Filed July 20, 1961 3 Sheets-Sheet 2

INVENTORS.
HANS REINHARD FEHLING &
EDWARD HENRY HARVEY
BY
their ATTORNEYS

July 14, 1964    H. R. FEHLING ETAL    3,140,695
RESERVOIR SEAL FOR WRITING INSTRUMENT
Filed July 20, 1961    3 Sheets-Sheet 3

INVENTORS.
HANS REINHARD FEHLING &
EDWARD HENRY HARVEY
BY
their   ATTORNEYS

United States Patent Office 3,140,695
Patented July 14, 1964

3,140,695
RESERVOIR SEAL FOR WRITING INSTRUMENT
Hans Reinhard Fehling, Zug, Switzerland, and Edward Henry Harvey, London, England, assignors to I. R. C. Limited, London, England, a company of Great Britain
Filed July 20, 1961, Ser. No. 125,552
Claims priority, application Great Britain July 30, 1960
9 Claims. (Cl. 120—42.4)

This invention relates to seals for liquid reservoirs in writing or other dispensing instruments and, more particularly, to a new and improved reservoir seal which is effective over a wide range of temperature and pressure conditions.

This application is a continuation-in-part of our copending application for "Seal for Reservoirs of Writing and Other Dispensing Instruments," Serial No. 5,872, filed February 1, 1960. In the copending application there is described a seal for a liquid reservoir having a bore open at one end to the exterior of the reservoir comprising a pair of spaced piston followers slidable in the bore each forming a clearance space of capillary dimensions between itself and the wall of the bore. One end of one of the two pistons is immersed in the reservoir liquid and a second body of liquid surrounds the other of the two pistons so that a body of gas is trapped between the two.

In order to prevent the piston which is immersed in the reservoir liquid from being drawn into that body of liquid by the capillary force of the liquid meniscus in the clearance space surrounding that piston, the follower arrangement described in the copending application includes means for urging the two pistons together, which raises the pressure in the trapped body of gas sufficiently to balance the capillary force. Consequently, an effective seal is formed which is independent of the orientation of the reservoir or the position of the follower in the reservoir. The embodiments described in that application, however, require magnets or mechanical or air springs connecting the pistons and therefore they necessitate complex fabricating and assembly operations. Also, the urging force is a function of the spacing of the two pistons which, in turn, varies with the temperature and the external pressure.

Accordingly, it is an object of the present invention to provide a new and improved liquid reservoir seal for a writing or dispensing instrument which is easy to make and install.

Another object of the present invention is to provide a new and improved reservoir seal which is effective over a wide range of temperatures and pressures.

A further object of the invention is to provide a reservoir seal which is effective in every orientation of the reservoir.

These and other objects of the invention are accomplished by providing, in a liquid reservoir having a bore and a follower slidable in the bore comprising a pair of piston elements and means joining the piston elements to hold them in spaced relation, expansion duct means in one of the two piston elements providing a liquid sealed duct of capillary dimensions communicating with the space between the piston elements so as to permit a body of gas trapped between the elements to expand or contract without breaking the seal formed by the liquid meniscus surrounding each piston element.

In one embodiment the expansion duct means comprises an extension of one of the two piston elements projecting into the space between the two elements and forming a capillary space with the wall of the bore. In another embodiment the expansion duct means comprises a series of capillary flutes formed in the outer surface of this extension while in other embodiments the expansion duct means is in the form of one or more capillary passageways extending through one of the piston elements. In each instance there is a body of liquid communicating with the expansion duct means which may be the reservoir liquid, the body of liquid in the annular space surrounding the piston element which is not immersed in the reservoir liquid, or an entirely separate body of liquid.

Further objects and advantages of the invention will be apparent from a reading of the following description in conjunction with the accompanying drawings, in which.

Figure 12:
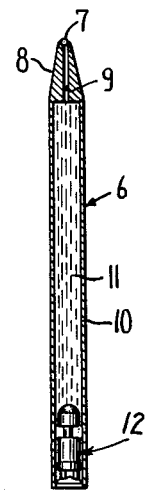
FIGURE 12 is a view in longitudinal section of a complete reservoir having a follower of the type shown in FIGS. 1-3.

While the invention is applicable to reservoirs of writing instruments such as fountain pens, stylographic pens and ball-point pens, it is also applicable to dispensing instruments or applicators (primarily those having a ball-tip or ball-valve discharge end) such as may be used for dispensing or applying deodorants, scent and other cosmetics. It is especially applicable to the reservoirs of ball-point writing instruments, for the difficulties which the invention seeks to reduce have chiefly arisen in connection with ball-point writing instruments. Accordingly, the invention is described herein with reference to a typical ball point writing instrument shown in FIG. 12 comprising a writing ball 7 mounted in a writing tip 8 and communicating through a feed duct 9 with a tubular reservoir 10 containing a column of writing ink 11.

Figure 1:
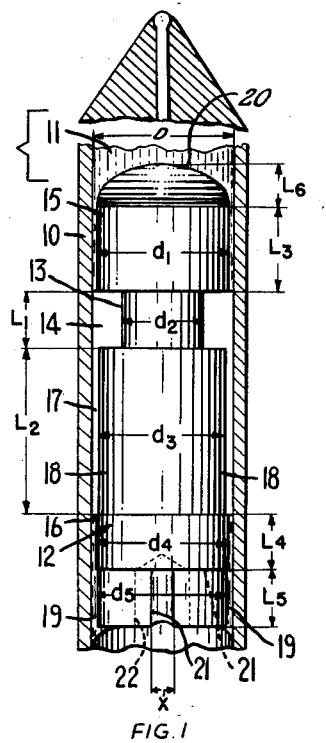
FIGURE 1 is a fragmentary exploded view in longitudinal section, partly broken away, through writing instrument having a reservoir incorporating a representative follower according to this invention showing the capillary expansion duct filled with air.
Figure 2:
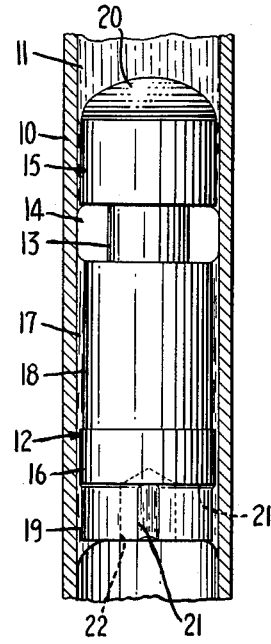
FIGURE 2 is a fragmentary view of the reservoir shown in FIGURE 1 illustrating the condition where the trapped air has contracted to the minimum space volume and the expansion duct is filled with sealing liquid.
Figure 3:
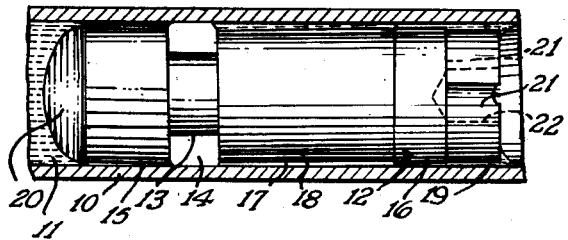
FIGURE 3 is a fragmentary view of the reservoir of FIGURE 1 showing an intermediate condition between those shown in FIGURES 1 and 2.

Turning to the enlarged fragmentary views of FIGURES 1-3, the tubular reservoir 10 (e.g., the reservoir of a writing instrument) contains a column of liquid 11 (e.g., ink) on the top of which there is a solid follower or piston 12 of circular cross section. At an intermediate region in its length this follower is reduced in diameter or waisted as at 13 to provide an annular gas chamber 14 between two piston elements formed by the front and rear portions 15, 16 respectively of the follower. Each end portion has a sealing region (indicated at $d_1$ and $d_4$ respectively) at which its periphery is an easy sliding fit in the bore, leaving a clearance space of capillary dimensions, the reservoir fluid enters the clearance surrounding the front portion 15 and a separate body of sealing liquid 19 surrounds the rear portion 16. Each sealing region preferably terminates, at its inner end, in a step or corner.

In a conventional reservoir seal utilizing a solid piston follower, one end or face of the follower is immersed in the reservoir liquid whilst the other end or face (usually subject to atmospheric pressure) emerges from it with the result that at the later end a small meniscus is formed at the surface of the thin annulus of liquid filling the clearance between the follower periphery and the reservoir wall.

If this meniscus is concave, the resulting capillary forces produce a depression (below atmospheric pressure) in this annulus of liquid. In consequence there is a pressure difference between the two faces or ends of the follower which, even if the latter has the same bulk density (apparent specific gravity) as the liquid, tends to force the follower into the liquid.

If this force is not balanced by an opposing force, the follower will move into the liquid and extrude the latter through the above-mentioned annular clearance. This condition usually occurs when the writing instrument lies on its side. Movement of the follower into the liquid will continue until the concave meniscus changes its shape in such a way that the resulting capillary forces no longer reduce the hydrostatic pressure in the reservoir, i.e., when, in effect, the pressure difference between the two ends of the follower has vanished. The capillary pressure can only decrease if the radius of the meniscus increases, i.e., if a strong, stable meniscus, changes into a weak and usually unstable meniscus, whether slightly convex or slightly concave. When this happens there is danger of liquid seepage toward the rear end of the reservoir, especially if there already exists a film of liquid on the reservoir wall behind the follower (as may happen due to the liquid level being lowered by the dispensing of liquid).

There is another and additional reason why there is danger of seepage. When the reservoir is lying on its side the annulus of liquid between the follower periphery and the reservoir wall, at the lower part of the follower periphery, is subjected to a positive hydrostatic head the magnitude of which is proportional to the diameter (or equivalent dimension) of the reservoir. Hence it is at this lower part of the follower periphery that liquid seepage takes place, unless the hydrostatic head at each point of the annular surface of the liquid is balanced by the local capillary pressure (depending on the local radius of curvature of the liquid surface).

In this specification the expression "strong meniscus" is used to indicate a meniscus which is very stable (and not one where the surface tension force is particularly high, for surface tension is constant and independent of curvature); the most important feature producing stability is a small radius of curvature, because such a meniscus will not practically change its shape in various positions of the instrument.

In order to reduce or eliminate the aforementioned seepage of liquid toward the rear end of the reservoir 10, the follower or piston 12 of the present invention is provided with a liquid-sealed capillary expansion duct, connecting with the gas chamber 14, for accommodating expansion and contraction of the trapped gas by movement of the liquid seal along said duct. The expression "capillary" is used in relation to the expansion duct to indicate that the sealing liquid maintains a stable sealing meniscus therein under normal conditions of usage, and preferably in all attitudes of the reservoir. The inner end portion is that end portion which is presented to the column of liquid in the bore and the outer end portion is a portion which is separated from the column of liquid by the inner end portion and the gas chamber.

It will be appreciated that in all constructions hereinafter described the expansion duct comprises one or more ducts formed either (a) in the interior of the follower or piston or (b) by a reduction in the cross-sectional area of the follower or piston at a region forward of the sealing region of the outer end portion or rearward of the sealing region of the inner end portion.

In the embodiment of the invention shown in FIGURES 1–3, the follower 13 is provided with a capillary expansion duct in the following manner. Intermediate the sealing region of the rear portion 16 and the waist 13 the follower includes an expansion duct portion which is slightly reduced in diameter at 18 to provide means forming a capillary expansion duct 17 of annular form, which communicates directly between the gas chamber 14 and the clearance around that sealing region and which has a clearance greater than that of sealing region.

The front end 20 of the follower is domed or coned to obviate air being trapped between the follower and the liquid in the reservoir when the follower is introduced. If desired, the follower may be made of two moulded parts which on assembly become connected. The inner end portion is preferably made of polyethylene, which is unaffected by normal ball-point pen inks.

Principal dimensions for the follower shown in FIGURE 1 are given in the following table:

| | |
|---|---|
| D | mm. dia 5 |
| $d_1$ | mm. dia 4.9 |
| $d_2$ | mm. dia 2.9 |
| $d_3$ | mm. dia 4.7 |
| $d_4$ | mm. dia 4.87 |
| $d_5$ | mm. dia 4.75 |
| L1 | mm. 2 |
| L2 | mm. 6 |

The radial width of the expansion duct is therefore 0.15 mm. It is thought that the two portions of the follower should be spaced (i.e., dimension L1) not less than 2 mm. apart at the outer periphery of the follower, in order to prevent the two liquid menisci from joining.

It will be noted from the foregoing table of dimensions that $d_4$ is slightly smaller than $d_1$, so that the clearance around the outer end portion 16 is made slightly greater than that around the portion 15, thereby ensuring that any air bleed which may take place will take place past the portion 16 and not past the portion 15. As described hereinafter, the viscosity of the sealing liquid 19 surrounding the portion 16 is preferably less than that of the reservoir liquid as an added precaution against air passing from the chamber 14 into the reservoir liquid. It will also be noted that $d_5$ is slightly smaller than $d_4$. It has been found that this assists the detachment of small individual bubbles when air is bled off as described.

Less important dimensions are as follows:

| | mm. |
|---|---|
| L3 | 3 |
| L4 | 2 |
| L5 | 3 |
| L6 | 1.5 |
| $x$ | 1 |

It will be seen that the reservoir liquid fills the narrow annular clearance between the periphery of the front end portion 15 and the interior of the reservoir and presents a concave meniscus at the rear corner or edge of said portion 15. Such a corner or edge anchors the liquid meniscus. A similar corner of edge is preferably provided at the forward end of portion 18 for the same purpose. The sealing liquid 19 fills the annular clearance between the sealing region of rear portion 16 and the interior of the reservoir and presents a concave meniscus at the forward edge of said portion 16. In the condition shown in FIGURE 1, the chamber 14 and the annular expansion duct 17 are filled with air. That is to say, the trapped air is at its maximum volume and the maximum permissible pressure differential, as fully described in the above-mentioned copending application, exists across the annular meniscus of the sealing liquid 19 adjacent to the body of air.

The radial width of the clearance around the sealing region of each end portion should preferably, assuming that end portion to be centrally disposed in the bore, not be greater than 0.1 mm. The expansion and contraction which it is desired to accommodate is that which is due to changes in atmospheric pressure, or temperature, or both, under normal conditions of usage. If the reservoir is intended for use at a substantially constant ambient atmospheric pressure, for example, at or near sea level, it is desirable that the total volume available, in the expansion duct, for the trapped gas should be at least 10% of the volume of the gas chamber 14. If the reservoir is to be used under widely varying conditions of atmospheric pressure, this figure may be increased to at least 50%. For example, the total volume available for the trapped air may be made 50% greater than that of the chamber 14 alone, as required for an instrument intended to be used in an aircraft with a cabin altitude of 8000 feet, by selecting values for the dimensions D, $d_2$, $d_3$, L1 and L2 which will satisfy the following equation:

$$\frac{\pi}{4}[(D^2-d_2^2)L_1 + (D^2-d_3^2)L_2] = 1.5 \times \frac{\pi}{4}(D^2-d_2^2)L_1$$

FIGURE 2 illustrates the condition in which the trapped air has contracted to the minimum safe volume and therefore occupies only the gas chamber 14, the expansion duct 17 being occupied by the sealing liquid and the annular meniscus of this liquid having advanced from the inner edge of the sealing region of portion 16 of the follower to the inner edge of portion 18.

FIGURE 3 illustrates an intermediate condition in which, the reservoir being horizontal the expansion duct 17 is only partly filled with the sealing liquid. At the upper part of this duct the meniscus has advanced part way along portion 18 but in the lower part of this duct it has advanced to the end of this portion 18 and is anchored at the corner or edge thereof.

It will be appreciated that it is desirable to provide a capillary reservoir from which the sealing liquid may be drawn to fill, or partly fill, the expansion duct as the trapped air contracts and into which the sealing liquid may recede from the expansion duct as the trapped air expands. The reserve sealing liquid may also serve to coat the inner surface of the reservoir 10 as the follower 12 transverses the reservoir when the reservoir liquid 11 is dispensed. This sealing liquid reservoir must of course be able to communicate with the expansion duct at a region remote from the gas chamber 14. In the construction shown in FIGURES 1–3 this reservoir comprises a pair of slots 21 of capillary size cut at right angles to one another across the outer end of the follower. In addition, there is a central hole 22 of capillary size from which the slots radiate. This central hole 22 may be dispensed with if only a small reserve supply of sealing liquid is required. In an alternative construction (not shown) radial holes, of capillary size, leading outwards from the central reservoir hole 22 may be provided instead of the slots 21. In a further alternative (not shown) the reservoir may be formed by a plurality of longitudinal slots, of capillary size, similar to those illustrated at 23h in FIGURE 5.

The sealing liquid 19 need not be of particularly high viscosity. It is preferably less than that of the reservoir liquid for the reason previously described, i.e., to assure that any bleeding of air takes place past the rear sealing portion and not into the reservoir. It should be high enough to prevent any scattering or loss of the liquid (drop formation) when subjected to the shocks experienced in normal use of the instrument. It should be low enough to assure a rapid movement of the liquid into and from the expansion duct and to avoid the adherence of too thick a film on any surface from which the liquid recedes in such movements. It has been found that liquid paraffin and castor oil are satisfactory in normal conditions.

The specific gravity of the follower material should be low enough with respect to that of the ink to ensure that the pressure exercised by the follower on the ink in the nib down position is less, and preferably substantially less, than the maximum capillary pressure at the inner end portion of the plug, but the exact value of the specific gravity is not important. For normal dimensions of the reservoir any suitable "plastic" material is from this aspect satisfactory.

In a construction in which the chief dimensions are given in the foregoing table, the hole 22 may be 2 mm. in diameter and depth and the slots 21 may be 1 mm. wide and 2 mm. deep.

In use, the waisted follower or piston 12 of FIGURES 1–3 is fitted into the vented bore of the reservoir 10, the end portions 15 and 16 being a comparatively close but easy sliding fit in the bore. The inner end portion 15 is immersed in the liquid 11 contained in the reservoir and a few drops of a sealing liquid 19 are applied to the opposite end of the follower. This sealing liquid rapidly runs round the clearance between the periphery of the outer end portion 16 of the follower and the reservoir wall, thereby trapping a quantity of the gas (such as air) in which this operation is conducted, in the gas chamber 14 provided at the waist of the follower. The advancing meniscus of the sealing liquid 19 pressurizes the trapped gas to a pressure greater than atmospheric and slightly exceeding that of the reservoir liquid 11 in the clearance around the inner end portion 15. Thereafter, the two concave menisci (namely that of the annulus of reservoir liquid 11 around the sealing region of the inner end portion 15 and that of the annulus of sealing liquid 19 around the sealing region of the outer end portion 16 of the follower) have equal strength, as the radius of curvature of each of the two menisci depends on the pressure of the trapped gas and on the surface tension of the liquid. The differential pressure across these menisci is equal to the trapped air pressure measured above atmospheric pressure. Provided that under all conditions of atmospheric temperature and pressure the pressure differential across the respective menisci does not fall outside the limits determined in this manner described in the above-mentioned copending application, then the menisci will be stable and runback will be avoided in all attitudes of the reservoir.

It is in order to satisfy these conditions that the capillary expansion duct is provided, for it provides a means of allowing a controlled expansion and contraction of the trapped gas to take place without endangering the stability of the menisci. Under normal changes of temperature or pressure, or both, the trapped gas can freely expand and reversibly contract by displacing the liquid 19 along the liquid-sealed capillary expansion duct 17 without escape of gas (on expansion) from the expansion duct and (on contraction) without the opposing menisci joining or the seal around the outer end portion 16 being permanently broken.

After initial assembly in a reservoir there may arise conditions where the trapped gas pressure momentarily exceeds the permissible maximum value referred to above due to an increase in ambient temperature or to a decrease in atmospheric pressure. When this occurs the liquid-sealed capillary expansion duct acts as a bleed valve, allowing bubbles of gas to escape one by one past the seal at the outer end portion 16, but promptly resealing the trapped gas as each bubble of gas is freed. As previously described the reduced dimension $d_5$ facilitates this bubbling action and the smaller dimension $d_4$ of the rear portion 16 as compared with the dimension $d_1$ of the forward portion 15 and the lower viscosity of the sealing liquid 19 than that of the reservoir liquid 11 ensure that such bleeding occurs at the rear end of the follower and not inwards into the reservoir liquid 11. This bleeding action is not harmful since the capillary expansion duct is of sufficient volume to ensure that the meniscus around the rear end portion 16 of the follower does not recede into the gas chamber 14 during any subsequent contraction of the trapped air. If desired, after the follower has been assembled as already described, the assembly may be exposed to pressure and temperature conditions representing the maximum expansion for which it has been designed in order to bleed-off all excess gas before the reservoir leaves the manufacturer. In this case there will be no bleeding-off in use under the conditions envisaged.

Figure 4:
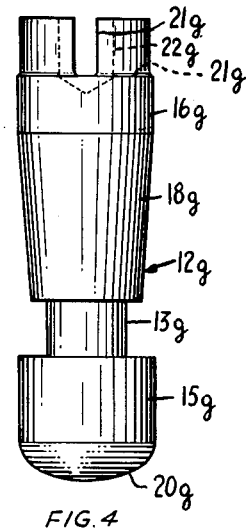
FIGURE 4 is an elevation view of a modified form of follower.

In the construction shown in FIGURES 1–3 there is a step at the inner end of the sealing region of portion 16 which normally tends to anchor the inner meniscus of the sealing liquid. FIGURE 4, wherein the elements corresponding to those of FIGS. 1–3 are identified with the same numeral having the suffix "g" shows a construction in which this step is dispensed with, for the expansion duct portion 18g of the follower is tapered with the result that when the follower is assembled in the reservoir the annular expansion duct will taper from a maximum radial width at its inner end where it is provided with a corner or edge and communicates with the gas chamber 14g to a minimum radial width at its outer end where it merges into the sealing region clearance around the portion 16g. In this construction the lateral stability of the annular meniscus is improved and the corner or edge becomes less important than in the embodiment of FIGURES 1–3 where it is highly desirable.

Figure 5:
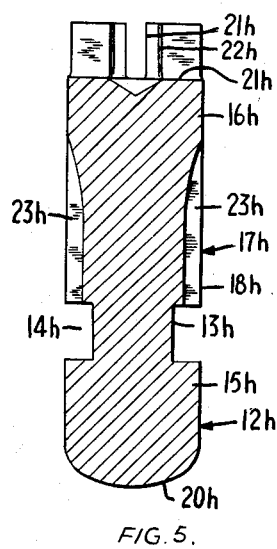
FIGURE 5 is a sectional elevation of a further form of follower.

In a modified form of follower, an inward extension of one end portion of the follower or piston comprising an expansion duct portion has its periphery formed with at least one groove extending between the gas chamber and the sealing region of that piston so as to provide a liquid-sealed capillary expansion duct which communicates directly between the gas chamber and the clearance around that sealing region and which accommodates expansion and contraction of the trapped gas by movements of the sealing liquid along it. This arrangement is shown in FIGURE 5 wherein the corresponding elements have the same reference numeral with the suffix "h" added, in which the expansion duct 17h is constituted by one or more flutes or slots 23h of capillary size cut axially into the periphery of the part 18h of the follower so as to lead from the gas chamber 14h to the sealing region clearance around rear end portion 16h. This construction preferably has a sharp corner or edge where it communicates with the gas chamber.

This construction provides for an increased stability of the inner annular meniscus of the sealing liquid when the latter fills, or recedes from, the expansion duct 17h following the contraction or expansion of the gas. If there is a single capillary slot 23h, it may extend for the whole length of the portion 16h.

Figure 6:
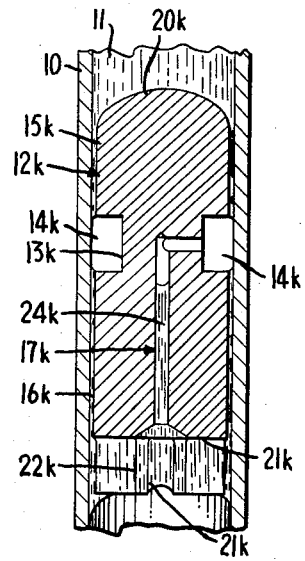
FIGURE 6 is a fragmentary view in longitudinal section through a reservoir incorporating a still further follower according to this invention.

In a further modification an expansion duct portion of the follower is provided internally with a liquid-sealed capillary expansion duct, comprising at least one capillary hole or other capillary passage leading from the gas chamber, for accommodating expansion and contraction of the trapped gas by movement of the liquid seal along it. One embodiment of this modification is shown in FIGURE 6 wherein the expansion duct 17k consists of a capillary hole 24k leading from the gas chamber 14k outwards through the follower to a sealing liquid reservoir 21k, 22k similar to that of FIGURES 1–5. The hole 24k may, as shown, have a sharp corner or edge where it communicates with the gas chamber. A convenient size for this hole 24k is 0.5 mm. diameter.

Figure 10:
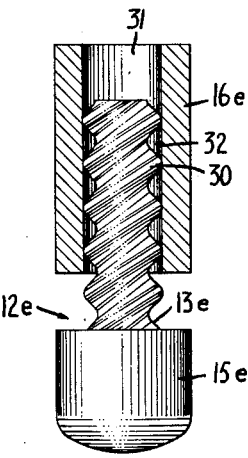
FIGURES 10 and 11 illustrate additional forms of followers according to the invention having internal expansion ducts.

The internal capillary expansion duct may follow a helical or other tortuous path so as to provide an increased length to accommodate greater gas expansion or it may comprise a plurality of ducts. In the embodiments of the invention illustrated in FIGURES 10 and 11 typical followers having an internal capillary expansion duct of greater capacity than the follower of FIGURE 6 are shown. To this end the follower 12e of FIGURE 10 comprises a front portion 15e provided with a rearwardly extending projection 13e of reduced diameter which is formed with a helical thread 30. This projection is inserted part way into and forms a tight fit in an axial opening 31 of a rear portion 16e so as to form, in an expansion duct portion of the element 16e, a helical expansion duct 32 extending from the space between the two portions 15e and 16e. It will be readily apparent that the expansion duct can be filled or partly filled with a body of liquid which is not the same as the body of sealing liquid surrounding the portion 16e of the follower. Preferably, the part of the opening 31 to the rear of the projection 13e is of capillary dimensions to hold a reserve supply of liquid for the expansion duct.

Figure 11:
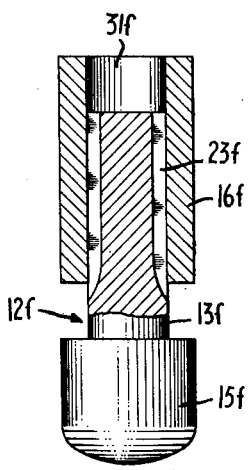

Another follower arrangement 12f, shown in FIGURE 11, comprises a forward portion 15f having a rearward projection of reduced diameter 13f which fits into an axial opening in an expansion duct portion of rear portion 16f. In this case the projection 13f is made with a plurality of flutes 23f which are similar to the flutes 23h of FIGURE 5 and extend from the space between the two portions 15f and 16f to the rear end of the projection.

Figure 7:
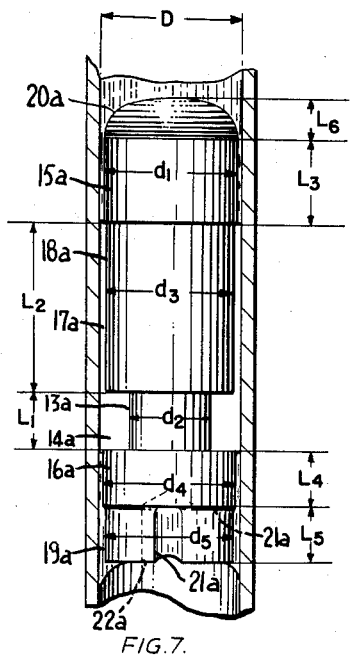
FIGURES 7, 8 and 9 show further constructions according to this invention, in which the expansion duct is directed inwards from the gas chamber.
Figure 8:
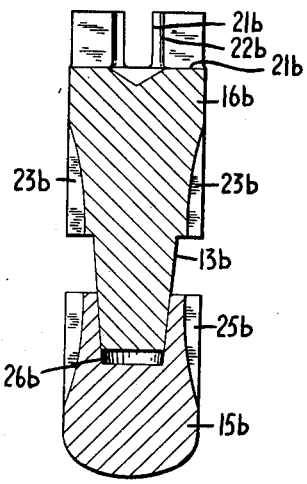
Figure 9:
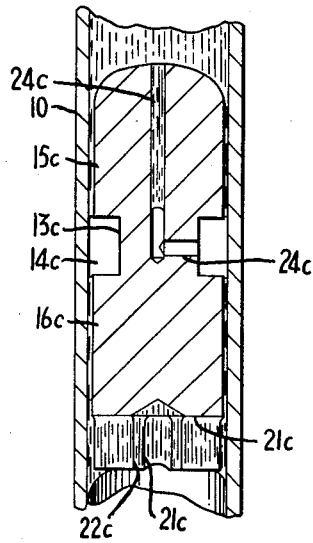

Instead of the expansion duct being directed outwards from the chamber as in all the constructions illustrated in FIGURES 1–6, 10 and 11 herein, it may be directed inwards from the gas chamber toward the reservoir liquid column. Such reversed constructions are shown in FIGURES 7–9 wherein parts similar to those of FIGURES 1–6 are identified with like reference numerals but with the letter suffixes "a," "b," and "c," respectively. FIGURE 7 shows a construction in which the capillary expansion duct 17a is of annular form and surrounds a reduced rear end 18a of the forward portion 15a of the piston or follower. It will be seen that this expansion duct communicates between the gas chamber 14a and the clearance around that part or region of the portion 15a which is preferably a close sliding fit in the bore of the reservoir 10. The front portion of the follower is provided with a step where it is reduced to the part 18a so as to anchor the meniscus of the liquid which occupies said clearance. (FIGURE 7 shows the follower with the trapped air in the fully expanded condition.) The part 18a is also provided with a corner or edge where the annular expansion duct communicates with the gas chamber 14a. The reservoir for the sealing liquid 19a around the rear portion 16a of the follower is as described with reference to FIGURE 1 and in this construction all the dimensions are as listed herein with reference to FIGURE 1.

FIGURE 8 shows a follower in which the capillary expansion duct comprises flutes 25b in the front portion 15b of the follower, these flutes 25b being similar to the flutes 23h in FIGURE 5. Additionally the rear portion 16b of the follower may also be provided with flutes 23b. At the rear end portion 16b there is a capillary reservoir for the sealing liquid consisting of slots 21b and hole 22b as previously described.

FIGURE 8 also illustrates the fact that the follower may be made in two initially separate parts so as to simplify manufacture (for example by injection moulding). The reduced part 13b at the waist of the follower is formed as an axial projection on the front end of the rear portion 16b which projection fits into a hole 26b in the front portion 15b being secured if necessary by any suitable cement or adhesive. Following this illustration and description the application of a similar two-part construction to the other followers illustrated in the drawings will present no difficulty.

FIGURE 9 shows a construction in which the capillary expansion duct is constituted by a hole 24c leading from the gas chamber 14c to the front end face portion 15c of the follower so as to establish communication between the gas chamber and the liquid column in the reservoir 10.

Again a reservoir for the sealing liquid occupying the clearance around portion 16c of the follower is provided at the outer end of that portion, this reservoir being constituted by slots 21c and hole 22c as previously described.

It will be appreciated that with followers as shown in FIGURES 7 and 9, as the air or other gas trapped in the gas chamber 14c expands or contracts, the follower moves slightly outward from or sinks slightly into the liquid in the reservoir.

Although the invention has been described herein with reference to various specific embodiments, many modifications and variations therein will readily occur to those skilled in the art. Accordingly, all such variations and modifications are included within the intended scope of the invention as defined by the following claims.

We claim:

1. The combination of a tubular liquid reservoir and a sealing member comprising two piston elements each having a peripheral surface which forms a close sliding fit in the tubular reservoir to provide an annular clearance of capillary dimensions with the reservoir wall and which terminates in a relatively sharp corner at the end adjacent to the other piston element, means spaced from the reservoir wall at a substantially greater distance than the piston elements and joining the two piston elements to hold them in spaced relation, a body of liquid contained in the reservoir extending into the annular clearance surrounding a first of the two piston elements, a second body of liquid separated from the reservoir liquid extending into the annular clearance surrounding the second of the two piston elements, a body of gas trapped in the space between the two piston elements completely separating the two bodies of liquid, one of the piston elements including an expansion duct portion adjacent to the space between the two elements, the expansion duct portion including expansion duct means forming a liquid-sealed duct of capillary dimensions communicating directly with the space between the piston elements, the means forming the duct being spaced from the reservoir wall throughout its length by a distance greater than said annular clearance between the piston elements and the reservoir wall, thereby permitting expansion or contraction of the trapped body of gas while maintaining an annulus of liquid in the space surrounding each piston element.

2. The combination according to claim 1 wherein the expansion duct portion comprises an extension of said one piston element into the space between the two piston elements, said extension being of smaller size than the piston element, thereby forming, as the expansion duct means, a capillary annular space with the wall of the tubular reservoir.

3. The combination according to claim 2 wherein the extension of said one piston element is tapered inwardly in the direction toward the space between the piston elements.

4. The combination according to claim 1 wherein the expansion duct portion comprises an extension of said one piston element into the space between the two piston elements, said extension being formed with at least one groove of capillary dimensions in its outer surface communicating with the space between the two piston elements, thereby providing said expansion duct means.

5. The combination according to claim 4 wherein the extension is formed with a plurality of angularly-spaced longitudinal grooves, thereby providing said expansion duct means.

6. The combination of a tubular liquid reservoir and a sealing member comprising two piston elements each having a peripheral surface which forms a close sliding fit in the tubular reservoir to provide an annular clearance of capillary dimensions with the reservoir wall and which terminates in a relatively sharp corner at the end adjacent to the other piston element, means spaced from the reservoir wall at a substantially greater distance than the piston elements and joining the two piston elements to hold them in spaced relation, a body of liquid contained in the reservoir extending into the annular clearance surrounding a first of the two piston elements, a second body of liquid separated from the reservoir liquid extending into the annular clearance surrounding the second of the two piston elements, a body of gas trapped in the space between the two piston elements completely separating the two bodies of liquid, and expansion duct means in one of the two piston elements providing a liquid-sealed duct of capillary dimensions communicating with the space between the piston elements thereby permitting expansion or contraction of the trapped body of gas while maintaining an annulus of liquid in the space surrounding each piston element, wherein the expansion duct means comprises a passageway of capillary dimensions extending through said one piston element from the space between the two piston elements to the opposite side of said one piston element to communicate with a body of liquid which is exposed to the atmosphere.

7. The combination according to claim 6 wherein said one piston element comprises a hollow cylinder and the means joining the two piston elements has a threaded projection extending into the hollow cylinder to provide the passageway of capillary dimensions.

8. The combination according to claim 6 wherein said one piston element comprises a hollow cylinder and the means joining the two piston elements has a fluted projection extending into the hollow cylinder.

9. The combination according to claim 1 wherein the second piston element is formed with a plurality of capillary ducts at the end opposite to the first piston element to provide a reservoir for the second body of liquid.

References Cited in the file of this patent

UNITED STATES PATENTS

| | | |
|---|---|---|
| 2,557,409 | Brinson | June 19, 1951 |
| 2,777,422 | Cofield et al. | Jan. 15, 1957 |

FOREIGN PATENTS

| | | |
|---|---|---|
| 1,028,325 | France | Feb. 25, 1953 |
| 1,199,758 | France | June 22, 1959 |